(12) United States Patent
Xin et al.

(10) Patent No.: US 11,931,827 B2
(45) Date of Patent: Mar. 19, 2024

(54) LASER CUTTING DEVICE AND LASER CUTTING METHOD

(71) Applicant: HAN'S LASER TECHNOLOGY INDUSTRY GROUP CO., LTD., Guangdong (CN)

(72) Inventors: Huanyin Xin, Shenzhen (CN); Zhongqian Li, Shenzhen (CN); Hong Chen, Shenzhen (CN); Jiangang Lu, Shenzhen (CN); Hongjiang Zhang, Shenzhen (CN); Jiangang Yin, Shenzhen (CN); Yunfeng Gao, Shenzhen (CN)

(73) Assignee: HAN'S LASER TECHNOLOGY INDUSTRY GROUP CO., LTD., Guangdong (CN)

( * ) Notice: Subject to any disclaimer, the term of this patent is extended or adjusted under 35 U.S.C. 154(b) by 611 days.

(21) Appl. No.: 17/263,304

(22) PCT Filed: Jun. 22, 2020

(86) PCT No.: PCT/CN2020/097477
§ 371 (c)(1),
(2) Date: Jan. 26, 2021

(87) PCT Pub. No.: WO2020/239133
PCT Pub. Date: Dec. 3, 2020

(65) Prior Publication Data
US 2021/0162546 A1    Jun. 3, 2021

(30) Foreign Application Priority Data

May 31, 2019    (CN) .......................... 201910466903.1

(51) Int. Cl.
*B23K 26/38*    (2014.01)
*B23K 26/00*    (2014.01)
(Continued)

(52) U.S. Cl.
CPC .......... *B23K 26/38* (2013.01); *B23K 26/0006* (2013.01); *B23K 26/0608* (2013.01);
(Continued)

(58) Field of Classification Search
None
See application file for complete search history.

(56) References Cited

U.S. PATENT DOCUMENTS 3,947,093 A * 3/1976 Goshima ............ G02B 19/0028
359/716
7,528,079 B2    5/2009 Yamazaki et al.
(Continued)

FOREIGN PATENT DOCUMENTS

CN    1691278 A    11/2005
CN    1983511 A    6/2007
(Continued)

OTHER PUBLICATIONS

Machine translation of Japan Patent No. 05-104,276, 2023.*
(Continued)

*Primary Examiner* — Geoffrey S Evans
(74) *Attorney, Agent, or Firm* — Polsinelli PC

(57) ABSTRACT

Provided are a laser cutting device and a laser cutting method. The laser cutting device comprises a beam expanding element provided with a plurality of lens sets, wherein optical axes of the plurality of lens sets are located in the same line and each lens set comprises at least one lens; the beam expanding element is configured to convert an incident beam into a first beam; and a spectroscopic element arranged on a light path of an emitted light of the beam expanding element, and wherein the spectroscopic element is configured to convert the first beam into multiple second beams that are annular and spaced apart from each other.

10 Claims, 5 Drawing Sheets

(51) Int. Cl.
*B23K 26/06* (2014.01)
*B23K 26/067* (2006.01)
*B23K 26/08* (2014.01)
*G02B 27/09* (2006.01)
*B23K 101/40* (2006.01)
*B23K 101/42* (2006.01)
*B23K 103/00* (2006.01)

(52) U.S. Cl.
CPC ...... *B23K 26/0626* (2013.01); *B23K 26/0648* (2013.01); *B23K 26/0676* (2013.01); *B23K 26/08* (2013.01); *G02B 27/0916* (2013.01); *G02B 27/0927* (2013.01); *G02B 27/0955* (2013.01); *B23K 2101/40* (2018.08); *B23K 2101/42* (2018.08); *B23K 2103/56* (2018.08)

(56) References Cited

U.S. PATENT DOCUMENTS

| | | |
|---|---|---|
| 2014/0291308 A1 | 10/2014 | Lasagni et al. |
| 2016/0031037 A1 | 2/2016 | Chang et al. |
| 2019/0099993 A1 | 4/2019 | Chen et al. |
| 2020/0230740 A1* | 7/2020 | Ahn ................ B23K 26/0648 |

FOREIGN PATENT DOCUMENTS

| | | | | |
|---|---|---|---|---|
| CN | 101965243 | A | 2/2011 | |
| CN | 102084282 | A | 6/2011 | |
| CN | 106199983 | A | 12/2016 | |
| CN | 206153760 | U | 5/2017 | |
| CN | 106825943 | A | 6/2017 | |
| CN | 107243690 | A | 10/2017 | |
| CN | 108067756 | A | 5/2018 | |
| CN | 108161250 | A | 6/2018 | |
| CN | 110181179 | A | 8/2019 | |
| EP | 2275222 | A1 * | 1/2011 | ........... B23K 26/064 |
| JP | 05104276 | A * | 4/1993 | |
| JP | 2007142001 | A * | 6/2007 | ......... B23K 26/0057 |
| KR | 10-2012-0016457 | A | 2/2012 | |
| KR | 10-2014-0020776 | A | 2/2014 | |
| KR | 10-0014142 | A | 2/2015 | |

OTHER PUBLICATIONS

Machine translation of Japan Patent No. 2007-142,001, Sep. 2023.*
Chinese Office Action dated Aug. 21, 2020 issued in corresponding Patent Application No. 201910466903.1 (9 pages).
International Search Report dated Sep. 23, 2020 issued in PCT/CN2020/097477 (6 pages).
1 Chinese Office Action dated Apr. 2, 2021 issued in corresponding Patent Application No. 201910466903.1 (7 pages).

* cited by examiner

LASER CUTTING DEVICE AND LASER CUTTING METHOD

CROSS REFERENCES TO RELATED APPLICATION

This application is a National Stage of International Application No. PCT/CN2020/097477 filed on Jun. 22, 2020 which claims priority to Chinese Patent Application No. 201910466903.1, filed on May 31, 2019, entitled "LASER CUTTING DEVICE AND LASER CUTTING METHOD" the disclosure of which is hereby incorporated by reference in their entireties.

TECHNICAL FIELD

The present disclosure relates to a laser cutting device and a laser cutting method.

BACKGROUND

In conventional laser cutting technology, a laser beam is generally converged into a focal point to cut materials such as wafers. This cutting method generally requires the laser beam to be converged at a position with a certain depth of a processed material for cutting. Since energy at a converging point of the light beam is relatively high, when the focal point moves at the position with such depth, a modified layer can be formed on a moving path. Then, by forming a plurality of modified layers inside the processed material, the processed material can be easily split along these modified layers.

SUMMARY

According to embodiments of the disclosure, the present disclosure provides:

A laser cutting device includes:

a beam expanding element provided with a plurality of lens sets, and wherein optical axes of the plurality of lens sets are on the same straight line, each lens set is provided with at least one lens, the beam expanding element converts an incident light beam into a first light beam; and a spectroscopic element arranged on a light path of an emitted light of the beam expanding element, and wherein the spectroscopic element converts the first light beam into multiple second light beams that are annular and spaced apart from each other.

And a laser cutting method includes:

adjusting a spot of a laser beam emitted by a laser to have an appropriate size through a beam expanding element, such that the adjusted laser beam is capable of passing through a spectroscopic element completely;

forming the adjusted laser beam into multiple annular light beams by passing through the spectroscopic element;

passing the multiple annular light beams through a focusing lens and forming the multiple annular light beams into multiple focal points arranged spaced away on an optical axis of the focusing lens. The number of focal points is greater than or equal to two.

A distance between adjacent focal points in air is less than or equal to 20 µm; and distributing the multiple focal points formed by the focusing lens inside a processed material. The multiple focal points are capable of forming a plurality of modified layers inside the processed material. When the number of focus points and the range of the distance between the focal points as described above are satisfied, the laser cutting method can better cut the materials with smaller thickness such as MINI LEDs.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

The following drawings of the present disclosure are used herein as part of the present disclosure to understand the present disclosure. Embodiments of the present disclosure and description thereof are illustrated in the accompanying drawings to explain the principle of the present disclosure.

DETAILED DESCRIPTION OF THE EMBODIMENTS

After the single-focus cutting method completes the cutting at the position with a certain depth of the processed material, the depth of the focal point inside the material is further changed to perform the cutting again. Therefore, the modified layers need to be formed at a plurality of positions with different depths so that the processed material can be easily split, which greatly affects cutting efficiency.

In order to facilitate the understanding of the present disclosure, the present disclosure will be described more fully with reference to the relevant drawings. Preferred embodiments of the present disclosure are shown in the attached drawings. However, the present disclosure can be implemented in many different forms and is not limited to the embodiments described herein. On the contrary, providing these embodiments is to make the disclosure of the present disclosure more thorough and comprehensive.

It should be noted that when an element is referred to as being "fixed to" another element, it can be directly on another element or there may be an intermediate element therebetween. When an element is considered to be "connected to" another element, it can be directly connected to another element or there may be an intermediate element at the same time. On the contrary, when an element is referred as to be "directly on" another element, there is no intermediate element. Terms "vertical", "horizontal", "left", "right" and the like used herein are for illustrative purposes only.

Unless otherwise defined, all technical and scientific terms used herein have the same meaning as commonly understood by those skilled in the technical field of the present disclosure. The terms used in this specification are only for the purpose of describing specific embodiments, and are not intended to limit the present disclosure. Terms "and/or" as used herein includes any and all combinations of one or more related listed items.

Figure 1:
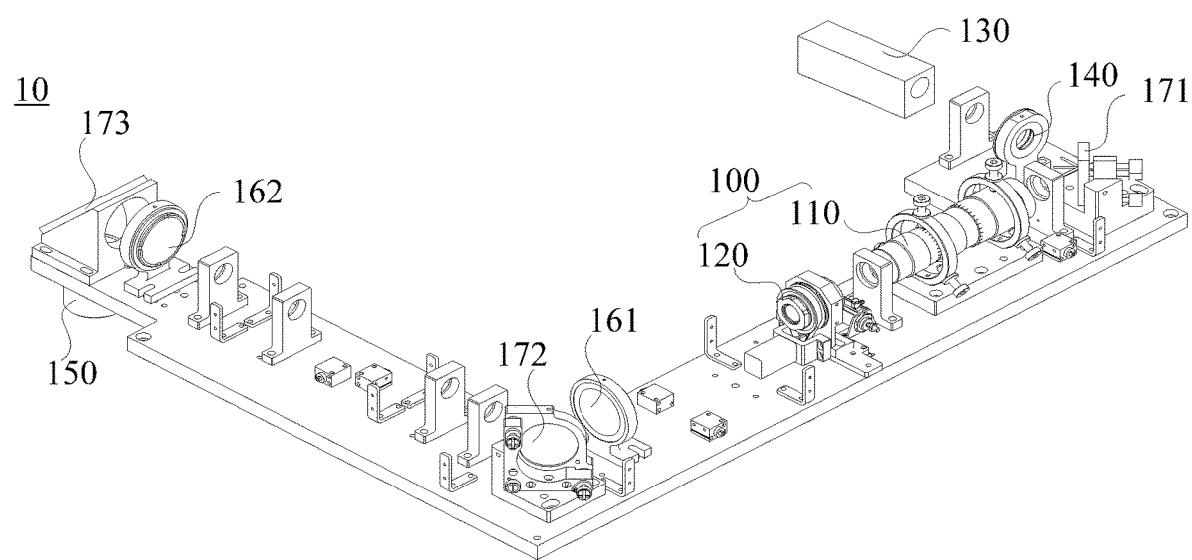
FIG. 1 is a schematic view of a laser cutting device according to an embodiment of the present application.

Referring to FIGS. 1, in order to improve efficiency of a laser cutting, a laser cutting device 10 in the present application is provided with an optical device 100. The optical device 100 includes a beam expanding element 110 and a spectroscopic element 120. The spectroscopic element 120 is arranged on a light path of an emitted light of the beam expanding element 110. A laser beam sequentially passes through the beam expanding element 110 and the spectroscopic element 120. The beam expanding element 110 can adjust a spot size of an incident light beam to form a first light beam. Optionally, the first light beam with the adjusted spot size can pass through the spectroscopic element 120 completely. That is, the first light beam will not be blocked by a fixing member held by the spectroscopic element 120. Then, the first light beam adjusted by the spectroscopic element 120 is converted into multiple (at least two) light beams that are annular and spaced apart from each other. Optionally, the first light beam is a parallel light beam. It should be noted that the above definition of "spaced apart from each other" should be understood that distances exist between the multiple second light beams when emitted from the spectroscopic element 120, and it is not limited to that the second light beams is always separated from each other during propagation.

Figure 2:
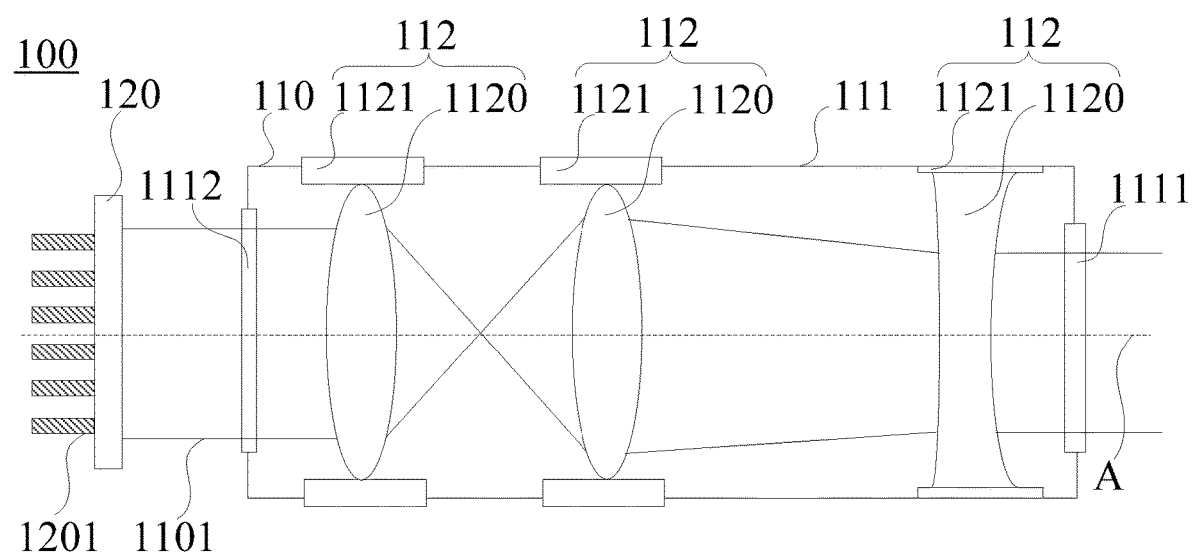
FIG. 2 is a schematic view of a beam expanding element and a spectroscopic element in the laser cutting device according to an embodiment of the present application.

Specifically, referring to FIG. 2, the beam expanding element 110 includes a plurality of (at least two) lens sets 112. Each lens set 112 is provided with at least one lens 1120. The spectroscopic element 120 is provided to convert the light beam (the first light beam 1101) emitted by the beam expanding element 110 into the multiple second light beams 1201, thereby achieving the effect of adjusting the beam shaping. When applied to the laser cutting device, the multiple second light beams 1201 can be formed into multiple (at least two) focal points of the same number to cut a processed material, such that a plurality of modified layers can be formed in the processed material at one time, improving the cutting efficiency.

In addition, for conventional laser multifocal cutting technology, when cutting the processed material with a smaller thickness, it is necessary to replace an optical diffractive element(s) to reduce the number of annular light beams, thereby reducing the number of focal points, such that the focal points formed by the laser beam can be all located in the processed material. When cutting the processed material with a larger thickness, the number of annular light beams needs to be increased to increase the number of focal points, such that the focal points formed by the laser beam are all located in the processed material while the formation of modified layers in the processed material is increased. However, it is too inefficient to change the number of focal points of the light beam by replacing the optical diffractive element. In addition, the replaced diffractive optical element has the problem that it is difficult to align its center with an optical axis of the incident light beam, which affects the symmetry of an emitted light beam, and finally it is difficult for the converged light beam to be converged at one point when cutting the material, which affects the cutting effect.

In order to avoid replacing the diffractive optical element while allowing the number of focal points formed by the laser beam to be directly and easily adjusted, in some embodiments, the optical device 100 in the laser cutting device can adjust the number of the second light beam 1201.

Referring to FIG. 2, in some embodiments, the beam expander element 110 can adjust the spot size of the light beam such that a spot area of the emitted light beam (the first light beam 1101) is larger or smaller than the spot area of the incident light beam. Optionally, the first light beam 1101 propagates parallel to an optical axis A of the beam expanding element 110. In some embodiments, the beam expanding element 110 has a magnification of 2 times to 8 times.

In some embodiments, the beam expanding element 110 further includes a housing 111. The lens set 112 is arranged inside the housing 111. The housing 111 is provided with a light entrance 1111 and a light exit 1112 that are provided oppositely. A center of the light entrance 1111 and a center of the light exit 1112 are on the same straight line as the optical axis A. The light beam can enter the inside of the housing 111 from the light entrance 1111, and exit from the light exit 1112 after being adjusted by the plurality of lens sets 112, and then is formed into the first light beam 1101.

The spectroscopic element 120 can convert the incident light beam (the first light beam 1101) into the multiple second light beams 1201. The distances exit between the adjacent second light beams 1201 when emitted by the spectroscopic element 120. In addition, the number of the second light beams 1201 depends on the spot area of the first light beam 1101. Specifically, the number of the second light beams 1201 is positively correlated with the spot area of the first light beam 1101. Optionally, a spot diameter of the first light beam 1101 is about 10 mm.

In some embodiments, at least one lens set 112 is a fixed lens set. At least one lens is arranged in the fixed lens set. The fixed lens set is relatively fixed to the housing 111. That is, the position of each lens 1120 of the fixed lens set in a direction of an optical axis of the housing 111 remains fixed. The fixed lens set can be connected to the housing 111 through a fixing member, or directly clamped in the housing 111. Optionally, a side of the beam expanding element 110 away from the spectroscopic element 120 is an object side. The lens set 112 closest to the object side is a fixed lens set. The position of the fixed lens set in the beam expanding element 110 is relatively fixed. The lens set 112 closest to the object side can diverge and transmit the incident light beam to the adjacent lens set 112. The spot area of the diverged light beam is increased, which facilitates the adjustment of the diverged light beam by the adjacent lens set 112, and makes full use of an edge area of the lens 1120 in the adjacent lens set 112 for refraction.

In some embodiments, at least two lens sets 112 in the beam expanding element 110 are movable lens sets. At least one lens 1120 is arranged in each movable lens set. Specifically, the movable lens sets include a driving member 1121. In the same movable lens set, the driving member 1121 can drive the lens 1120 in the movable lens set to reciprocate along the optical axis A relative to the housing 111. The driving member 1121 may be a voice coil motor or a manual adjusting member. The manual adjusting member may be a sliding structure in which a slider cooperates with a sliding groove. For example, the sliding groove is provided on the housing 111, and the sliding groove extends through the sliding groove. One side of the slider is connected to the lens 1120, and the other side thereof extends beyond the housing 1111. A portion of the slider extending beyond the housing 111 can slide to drive the lens in the movable lens set to move. The manual adjusting member can also be a knob structure. The knob has an annular structure. An outer side surface of the knob extends beyond the housing 111. An inner side surface of the knob is rotatably connected to the lens 1120 in the movable lens set. The outer side surface of the knob can be rotated to drive the lens 1120 in the movable lens set to move along the direction of the optical axis A.

After at least two movable lens sets are arranged, the relative distance between the movable lens sets can be adjusted, such that a divergence angle or a convergence angle of the light beam in the housing 111 can be adjusted through a part of the movable lens set. Then, the other part of the movable lens set can be adjusted to performing a collimation on the above-mentioned light beam with the specific divergence angle or the convergence angle, and obtain an emitted light beam (the first light beam 1101) with a corresponding spot size at the same time.

Referring to FIG. 2, Optionally, three lens sets 112 are arranged inside the housing 111, and two lens sets 112 of which adjacent to the light exit 1112 are movable lens sets, and one lens set 112 of which adjacent to the light entrance 1111 is a fixed lens set.

Figure 3:
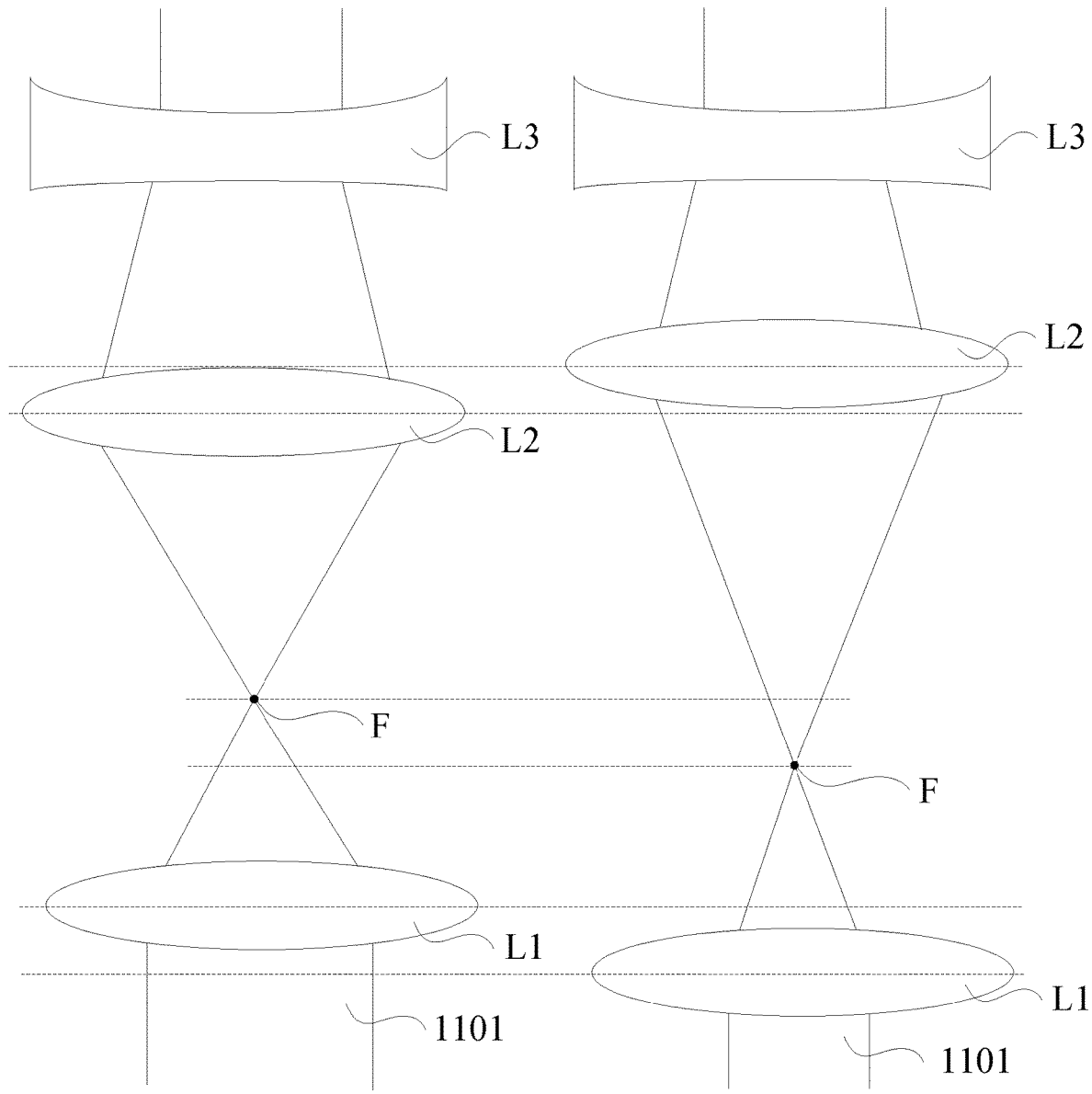
FIG. 3 is a schematic view of lens sets in a cooperating state in the laser cutting device according to an embodiment of the present application.

Specifically, referring to FIG. 3, the beam expanding element 110 is provided with three lens sets 112. A first movable lens set L1 providing positive refractive power, a second movable lens set L2 providing positive refractive power, and a third fixed lens set L3 providing negative refractive power are arranged from an image side to the object side. The third fixed lens set L3 can diverge the incident light and increase an area of the light beam irradiating the second movable lens set L2, thereby facilitating the second movable lens set L2 to adjust the light beam. Moreover, a focal point on the object side of the first movable lens set L1 remains coincident with a converging point of the light beam on the image side of the second movable lens set L2, and the coincident point is F. Therefore, the first light beam 1101 emitted by the first movable lens set L1 will become a parallel light.

Specifically, when the spot area of the first light beam 1101 needs to be increased, the second movable lens set L2 can be driven such that the second movable lens set L2 moves away from the third fixed lens set L3. In this case, the convergence angle of the light beam emitted by the second movable lens set L2 will be increased. In addition, the first movable lens set L1 is driven such that the focal point on the object side of the first movable lens set L1 coincides with a converging point of the light beam converged by the second movable lens set L2 at the point F. Through the above adjustment, the first light beam 1101 emitted by the first movable lens set L1 will be emitted in parallel and have a larger spot area.

On the contrary, when the spot area of the first light beam 1101 needs to be reduced, the second movable lens set L2 can be driven such that the second movable lens set L2 moves closer to the third fixed lens set L3. In this case, the convergence angle of the light beam emitted by the second movable lens set L2 will be reduced. In addition, the first movable lens set L1 is driven such that the focal point of the first movable lens set L1 on the object side coincide with the converging point of the light beam converged by the second movable lens set L2 at the point F. Through the above adjustment, the first light beam 1101 emitted by the first movable lens set L1 will be emitted in parallel and have a smaller spot area.

In other embodiments, the first lens set L1 can also provide negative refractive power, the second lens set L2 deliberately provides positive refractive power. A virtual focus on the image side of the first lens set L1 coincides with the converging point of the light beam on the image side of the second lens set L2.

It should be noted that, the third fixed lens set L3 can be replaced with a movable lens set in practice. Alternatively, the third fixed lens set L3 may not be provided, but only two movable lens sets are provided in the beam expanding element. In addition, more movable lens sets or fixed lens sets can be provided in the beam expanding element. The arrangement sequence of the fixed lens set and the movable lens set can be arbitrarily provided on the premise that the emitted light beam (the first light beam 1101) is parallel light beam.

It should further be noted that, a single positive lens will produce negative spherical aberration, and a single negative lens will produce positive spherical aberration. That is, when each lens set 112 is separately arranged and has only one lens, the light beam will not be well focused on one point after passing through the lens set 112, or a reverse extension line of the light beam during divergence cannot be well coincided with one point. Finally, the light beam cannot be formed into the parallel light beam after passing through the plurality of lens sets 112. In order to overcome this problem, in some embodiments, at least one lens set 112 is designed as a complex lens set. The complex lens set includes at least one positive lens and at least one negative lens, so as to achieve the effect of correcting the spherical aberration. The light beam has a better converging or diverging effect after passing through the complex lens set, improving a parallelism of the light beam (the first light beam 1101) finally emitted from the beam expanding element 110. Specifically, an optical adhesive can be provided in the complex lens set to adhere the lenses.

In some embodiments, the spectroscopic element 120 is an optical diffractive element. Specifically, the spectroscopic element 120 is provided with a plurality of concentric annular bands. According to light-transmitting properties of the annular bands, the annular belts can be divided into light-transmitting annular bands and non-light-transmitting annular bands. The light-transmitting properties of adjacent annular bands are different. Therefore, the incident light beams are formed into the multiple second light beams 1201 after passing through the plurality of light-transmitting annular bands. In this case, the multiple second light beams 1201 have higher contrast therebetween. In other embodiments, regions of the spectroscopic element 120 irradiated by the incident light beam can be light-transmissive. In this case, regions with different thicknesses can be provided on the spectroscopic element 120 such that phase difference is generated after the incident light beam passes through the regions with different thicknesses, and then incident light beam is formed into multiple concentric annular light beams through diffraction. In this case, the incident light beam can be converted into the multiple second light beams 1201 with less energy loss.

It can be learned from the above-mentioned structure of the spectroscopic element 120, after the first light beam 1101 with different spot areas is incident into the spectroscopic element 120, the light beam will be shaped and emitted. The incident light beams with different spot areas will determine the number of the second light beam 1201 emitted from the spectroscopic element 120.

Figure 4:
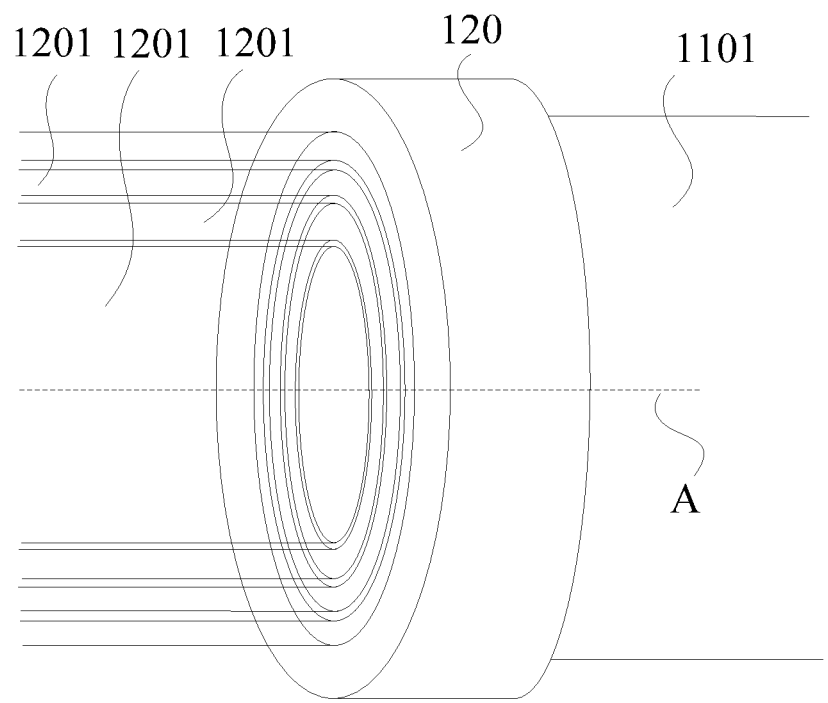
FIG. 4 is a schematic view of an adjustment of a light path of the spectroscopic element in the laser cutting device according to an embodiment of the present application.

In addition, referring to FIG. 4, in some embodiments, the spectroscopic element 120 may shape the first light beam 1101 into multiple annular light beams propagating along the optical axis A. The multiple second light beams 1201 propagating parallel to each other can be respectively focused on the same straight line parallel to a propagating direction of the light path, under the action of a focusing lens, thereby forming multiple focal points. That is, the multiple focal points are arranged spaced away on the optical axis of the focusing lens. Using the multiple focal points of the laser beam to cut a chip can cut a plurality of layers in a cross-section of the chip at one time, which can inhibit a diagonal crack of a crystal lattice in the chip, and generate a vertical guiding force for the pre-crack, so as to achieve the purpose of reducing a degree of the diagonal crack.

Figure 5:
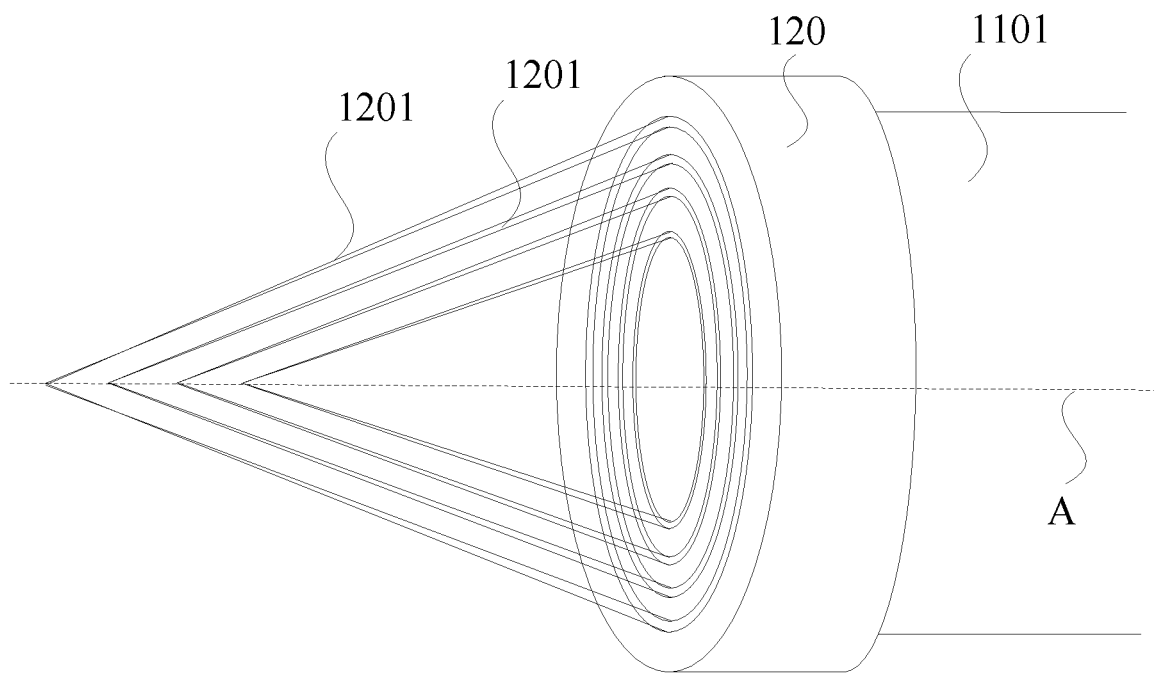
FIG. 5 is a schematic view of an adjustment of a light path of a spectroscopic element in a laser cutting device according to another embodiment of the present application.

Referring to FIG. 5, in other embodiments, the spectroscopic element 120 can not only shape the first light beam 1101 into the multiple annular light beams (the second light beam 1201), but can also focus the multiple second light beams 1201 on the optical axis A. As a result, multiple focal points of the same number as the second light beams 1201 are formed on the optical axis of the spectroscopic element 120. In this case, the second light beam 1201 that has focused into the multiple focal points can be directly used to cut the processed material. Alternatively, a focusing lens may be further arranged between the spectroscopic element 120 and the processed material to further focus the light beam emitted from the spectroscopic element 120, thereby shortening a focal length and saving working space.

As shown in FIG. 1, in some embodiments, the laser cutting device 10 includes a laser 130. A light beam emitted by the laser 130 can sequentially enter the beam expanding element 110 and the spectroscopic element 120. The laser cutting device 10 can be used to cut wafers, LED chips and the like, which have sapphire as a substrate, especially used to cut MINI LEDs.

Optionally, the laser 130 is a picosecond laser. The picosecond laser has an output power of 10 W, a pulse width in a range of 2 ps to 6 ps, and a wavelength of 1040 nm.

Generally, since the light beam emitted from the laser 130 is not ideally parallel light, in some embodiments, a zone plate 140 is further provided between the laser 130 and the optical device 100. The zone plate 140 is capable of performing a collimation on the light beam emitted from the laser 130. The laser beam is converted into a relatively ideal parallel light and then transmitted to the optical device 100.

Referring to FIGS. 4 and 1, when the spectroscopic element 120 converts the first light beam 1101 into the multiple second light beams 1201 propagating parallel to the optical axis A, the laser cutting device 10 needs to be further provided with a focusing lens 150, such that the multiple second light beams 1201 is focused into the multiple focal points with the same number as the second light beams 1201 and arranged spaced away on an optical axis of the focusing lens 150, so as to cut the processed material. In some embodiments, a focal length of the focusing lens 150 is 4 mm. In addition, a distance between adjacent focal points in air is less than or equal to 20 μm, optionally in a range of 4 μm to 8 μm. When the distance between adjacent focal points satisfies the above range, it can be advantageous for cutting thinner processed materials.

Optionally, the number of focal points is greater than or equal to two and less than or equal to fifteen. In addition, in some embodiments, when the beam expanding element 110 is provided and the number of focal points needs to be changed, the beam expanding element 110 can be directly adjusted to change the number of the second light beams 1201, thereby changing the number of focal points. By reasonably configuring the number of focus points and distances between the focal points, the laser cutting device 10 can better cut the MINI LEDs.

The conventional laser cutting device has a problem of too large distances between the focal points, and thicknesses of the MINI LED chips are smaller, such that the conventional laser cutting device cannot accurately cut the mini LED chips. When the relationship among parameters of the laser 130, the number of focal points and the distances between adjacent focal points as described above is satisfied, the laser cutting device 10 can efficiently and accurately cut the MINI LED chips.

Referring to FIG. 5, the spectroscopic element 120 can convert the first light beam 1101 into the multiple second light beams 1201, and focus the multiple second light beams 1201 onto the same straight line parallel to a propagating direction of the light beam, to form the multiple focal points of the same number and arranged spaced away. In this case, the multiple second light beams 1201 can be directly used to cut the processed material. That is, the multiple focal points arranged spaced away are distributed inside the processed material. When the number of focal points needs to be changed, the beam expanding element 110 can be directly adjusted to change the number of the second light beams 1201.

Referring to FIG. 1, in some embodiments, a first lens 161 and a second lens 162 for eliminating aberrations are sequentially arranged between the optical device 100 and the focusing lens 150. The first lens 161, the second lens 162, and the spectroscopic element 120 are arranged on a focal plane on an object side of the first lens 161. A focal point on an object side of the second lens 162 coincides with a focal point on an image side of the first lens 161. The focusing lens 150 is arranged on a focal plane on an image side of the second lens 162. In some of the embodiments, the first lens 161 and the second lens 162 are both independent positive lenses (focusing lenses) and have the same focal length.

Since the second light beam emitted by the spectroscopic element 120 will have serious aberrations after propagating a certain distance, it will not be possible to accurately cut the processed material. In addition, a light entrance of the conventional focusing lens 150 is smaller and cannot receive the second light beam completely. In this case, by providing the first lens 161 and the second lens 162, the aberration of the second light beam can be better eliminated, and the second light beam can pass through the focusing lens 150 completely.

Referring to FIGS. 1 and 4, when the second light beam 1201 emitted by the spectroscopic element 120 is the parallel light beam, the first lens 161 can converge the second light beam 1201. Then, the second lens 162 will convert the second light beam 1201 that has been converged and then diverged again, into a parallel light beam or a focused beam and transmit it into the focusing lens 150. Then, the focusing lens 150 converges the multiple second light beams 1201 on multiple focal points. Optionally, a focal length on the object side and a focal length on the image side of the first lens 161 are both 250 mm, and a focal length on the object side of the second lens 162 is 250 mm.

Continuing to refer to FIG. 1, in some embodiments, due to the diversity of the positions of the laser 130 and the optical device 100 in practical applications, the laser cutting device 10 is also provided with reflecting mirrors to adjust an orientation of the light path. Specifically, some laser cutting device 10 further include a first reflecting mirror 171, a second reflecting mirror 172, and a third reflecting mirror 173. In some embodiments, the propagating direction of the emitted light beam of the laser 130 and the optical device 100 is perpendicular to the propagating direction of the light beam that is finally used to cut the processed material. In this case, the propagating direction of the emitted light beam in the optical device 100 can be changed by providing the reflecting mirrors.

Specifically, in the embodiment shown in FIG. 1, the laser cutting device 10 is provided with the first lens 161, the second lens 162, the first reflecting mirror 171, the second reflecting mirror 172 and the third reflecting mirror 173. The first reflecting mirror 171 is arranged between the laser 130 and the beam expanding element 110 to reflect the light beam emitted by the laser 130 into the beam expanding element 110. In addition, the first lens 161, the second reflecting mirror 172, the second lens 162, and the third reflecting mirror 173 are sequentially arranged along the emitted light path of the spectroscopic element 120. The second reflecting mirror 172 can change an emitted light path of the spectroscopic element 120 by 90° for propagating. The third reflecting mirror 173 can also change a reflecting light path of the second reflecting mirror 172 by 90° for propagating. The emitted light path of the spectroscopic element 120, the reflecting light path of the second reflecting mirror 172 and a reflecting light path of the third reflecting mirror 173 are perpendicular to each other. The light beams reflected by the third reflecting mirror 173 will pass through the focusing lens 150, so as to be converged into multiple focal points. Optionally, a distance from the first lens 161 to the spectroscopic element 120 on the light path is 250 mm, a distance from the first lens 161 to the second reflecting mirror 172 on the light path is 70 mm, and a distance from the second reflecting mirror 172 to the second lens 162 on the light path is 430 mm.

Figure 6:
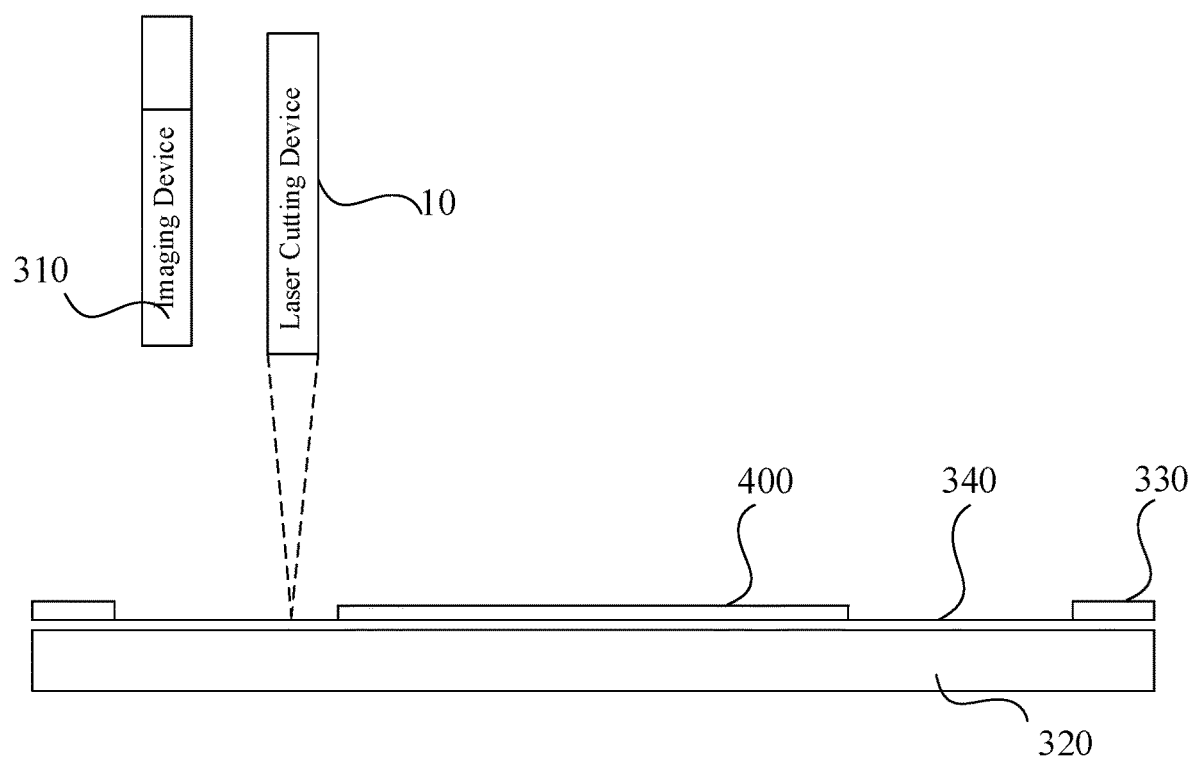
FIG. 6 is a schematic view showing an application scenario a laser cutting device according to an embodiment of the present application.

Referring to FIG. 6, in some embodiments, the laser cutting device 10 will work with an imaging device 310. When cutting the processed material 400, the imaging device 310 can acquire surface information on the processed material 400, so as to monitor whether the orientation of the cutting light beam is correct. Optionally, the imaging device 310 is a CCD (Charge Coupled Device). During processing, the processed material 400 is placed on an adhesive film 340. An edge of the adhesive film 340 is connected to an iron ring 330. The iron ring 330, the adhesive film 340 and the processed material 400 are all arranged above a transparent carrier 320. The adhesive film 340 may be made of a transparent or translucent material. After being processed by the laser, the chip is split by mechanical means such as a wedge.

In addition, this application also provides a laser cutting method to efficiently cut materials with a smaller thickness (such as a thickness of less than 100 μm) such as mini LEDs. In the laser cutting method, a spot of a laser beam emitted by the laser is adjusted to have an appropriate size by a beam expanding element, such that the adjusted laser beam can pass through a spectroscopic element completely. The laser beam adjusted by the beam expanding element is a first light beam. Then, the first light beam is adjusted by the spectroscopic element into multiple second light beams (annular light beams) spaced apart from each other. The multiple second light beams are focused by a focusing lens, so as to be formed into N (at least two) focal points arranged spaced away on an optical axis of the focusing lens. Optionally, the number of focal points is greater than or equal to two and less than or equal to fifteen. A distance between adjacent focal points in air is less than or equal to 20 μm, optionally in a range of 4 μm to 8 μm. Specifically, the multiple focal points formed by the focusing lens are distributed inside the processed material, and the multiple focal points can form a plurality of modified layers inside the processed material. When the number of focus points and the range of the distance between the focal points as described above are satisfied, the laser cutting method can better cut the materials with smaller thickness such as mini LEDs.

In some embodiments, under the adjustment of the beam expanding element, the first light beam can propagate parallel to a direction of an optical axis of the beam expanding element. In some embodiments, the multiple second light beams can also propagate along a direction of an optical axis of the spectroscopic element.

In some embodiments, the annular light beam emitted by the spectroscopic element will further pass through a first lens, which adjusts the annular light beam into a convergent light beam. The convergent light beam is reflected by a second reflecting mirror to a second lens, which will readjust the convergent light beam into multiple annular light beams. The spectroscopic element is arranged on a focal plane on an object side of the first lens. A focal plane on an object side of the second lens coincides with a focal plane on an image side of the first lens. The focusing lens is arranged on a focal plane on an image side of the second lens. The multiple annular light beams formed by the readjustment of the second lens are then reflected by a third reflecting mirror to the focusing lens. The first lens can converge the annular light beam to convert the annular light beam into the convergent light beam. According to a propagating principle of the light path, the convergent light beam will be re-magnified after be converged. After being re-magnified, the converged light beam will be readjusted into multiple annular light beams by the second lens. The number of re-formed multiple annular light beams is the same as the number of second light beams formed by the spectroscopic element. Optionally, the annular light beam formed by the adjustment of the second lens is emitted parallel to the direction of the optical axis of the second lens. In addition, the first lens and the second lens can be used as an optical 4F system to eliminate an aberration of the second light beam, and improve the quality of the focal points formed by the focusing lens, thereby improving the accuracy of the multi-focus cutting.

It should be noted that in some embodiments, the beam expanding element and the spectroscopic element can only form a fixed number of second light beams. Since the number of second light beams determines the number of focal points obtained by the focusing performed by the focusing lens, in this case, the number of second light beams can be changed by replacing the spectroscopic element, thereby changing the number of focal points formed by the focusing lens. In addition, in some embodiments, the first reflecting mirror, the second reflecting mirror, and the third reflecting mirror can be selected according to the actual orientating requirements (such as reducing a size of the actual device in a certain direction) of the light path, and it is not necessary for the laser beam to pass through all the reflecting mirrors. For example, the first reflecting mirror and the second reflecting mirror may be omitted, such that the light beam emitted by the laser can pass through the beam expanding element, the spectroscopic element, the first lens, the second lens, and the third reflecting mirror in a fixed direction, and then reflected by the third reflecting mirror to the focusing lens.

In other embodiments, the beam expanding element can cooperate with the spectroscopic element to adjust the number of second light beams, such that the number of focal points formed by the focusing lens can be changed by adjusting the beam expanding element. Specifically, the number of the annular light beams is positively correlated with the spot size of the first light beam incident into the spectroscopic element, and the number of focal points is the same as the number of second light beams. In this case, the beam expanding element is adjusted to change the spot size of the first light beam, so as to control the number of the second light beams reaching the focusing lens, thereby obtaining the required number of focal points to cut the processed material.

Technical features of the embodiments as described above can be arbitrarily combined. For simplifying the description, all possible combinations of technical features in the above embodiments are not described. However, as long as there is no contradiction in the combination of these technical features, they should be fallen within the scope of this description.

Only several implementations of the present disclosure are illustrated in the aforementioned embodiments, and the description thereof is relatively specific and detailed, but it should not be understood as a limitation on the scope of the present disclosure. It should be noted that for those of ordinary skill in the art, without departing from the concept of the present disclosure, several modifications and improvements can be made, which all fall within the protection scope of the present disclosure. Therefore, the protection scope of the present disclosure shall be subject to the appended claims.

What is claimed is:

1. A laser cutting device, comprising:
   a beam expanding element provided with a plurality of lens sets, and wherein optical axes of the plurality of lens sets are on the same straight line, each lens set is provided with at least one lens, the beam expanding element is configured to converts an incident light beam into a first light beam; and
   a spectroscopic element arranged on a light path of an emitted light of the beam expanding element, and wherein the spectroscopic element is configured to converts the first light beam into multiple second light beams that are annular and spaced apart from each other.

2. The laser cutting device according to claim 1, wherein the beam expanding element is capable of adjusting a spot size of the first light beam, the number of the second light beams is positively correlated with a spot area of the first light beam.

3. The laser cutting device according to claim 2, wherein the plurality of lens sets comprise at least two movable lens sets, the movable lens sets are capable of moving along a direction of the optical axis of the beam expanding element.

4. The laser cutting device according to claim 2, wherein a side of the beam expanding element close to the spectroscopic element is an image side, a side of the beam expanding element away from the spectroscopic element is an object side, the lens sets closest to the image side is a first lens set and a second lens set in sequence, the first lens set and the second lens set are the movable lens sets, the movable lens sets are capable of moving along the direction of the optical axis of the beam expanding element; the first lens set and the second lens set provide positive refractive power, a focal point on the object side of the first lens set coincides with a converging point of a light beam on the image side of the second lens set; or
   the first lens set provides negative refractive power, and the second lens set provides positive refractive power, a virtual focus on the image side of the first lens set coincides with a converging point of a light beam on the image side of the second lens set.

5. The laser cutting device according to claim 1, further comprising a picosecond laser, a light beam emitted by the picosecond laser sequentially passes through the beam expanding element and the spectroscopic element, the picosecond laser has an output power of 10 W, a pulse width in a range of 2 ps to 6 ps, and a wavelength of 1040 nm.

6. The laser cutting device according to claim 1, further comprising a focusing lens, the focusing lens being arranged in a light path of an emitted light of the spectroscopic element, and the focusing lens focusing the multiple second light beams into multiple focal points of the same number, the multiple focal points are arranged spaced away on an optical axis of the focusing lens, a distance between adjacent focal points in air is less than or equal to 20 µm.

7. The laser cutting device according to claim 6, wherein a first lens and a second lens for eliminating aberrations are sequentially arranged between the spectroscopic element and the focusing lens, wherein the spectroscopic element is arranged on a focal plane on an object side of the first lens, a focal point on an object side of the second lens coincides with a focal point on an image side of the first lens, the focusing lens is arranged on a focal plane on an image side of the second lens.

8. A laser cutting method, comprising:
   adjusting a spot of a laser beam emitted by a laser to have an appropriate size through a beam expanding element, such that the adjusted laser beam is capable of passing through a spectroscopic element completely;
   forming the adjusted laser beam into multiple annular light beams by passing through the spectroscopic element;
   passing the multiple annular light beams through a focusing lens and forming the multiple annular light beams into multiple focal points arranged spaced away on an optical axis of the focusing lens, and wherein the number of focal points is greater than or equal to two, a distance between adjacent focal points in air is less than or equal to 20 µm; and
   distributing the multiple focal points formed by the focusing lens inside a processed material, and the multiple focal points being capable of forming a plurality of modified layers inside the processed material.

9. The laser cutting method according to claim 8, wherein the annular light beam emitted by the spectroscopic element will further pass through a first lens, the first lens adjusts the annular light beam into a convergent light beam;
   the convergent light beam is reflected by a second reflecting mirror to a second lens, the second lens will readjust the convergent light beam into multiple annular light beams, and wherein the spectroscopic element is arranged on a focal plane on an object side of the first lens, a focal plane on an object side of the second lens coincides with a focal plane on an image side of the first lens, and the focusing lens is arranged on a focal plane on an image side of the second lens;
   the multiple annular light beams formed by the readjustment of the second lens are then reflected by a third reflecting mirror to the focusing lens.

10. The laser cutting method according to claim 8, wherein the number of the annular light beams is positively correlated with a spot size of the laser beam incident into the spectroscopic element, the number of focal points is the same as the number of annular light beams, the beam expanding element is adjusted to obtain a required number of focal points.

* * * * *